United States Patent [19]

Fujita

[11] Patent Number: 5,276,506
[45] Date of Patent: Jan. 4, 1994

[54] IMAGE PROCESSING APPARATUS FOR APPLYING SPECIAL EFFECTS TO IMAGE SIGNALS

[75] Inventor: Shinichi Fujita, Kanagawa, Japan

[73] Assignee: Sony Corporation, Tokyo, Japan

[21] Appl. No.: 933,807

[22] Filed: Aug. 24, 1992

[30] Foreign Application Priority Data

Aug. 28, 1991 [JP] Japan .................. 3-217047

[51] Int. Cl.$^5$ ............................ H04N 5/262
[52] U.S. Cl. ....................... 358/22; 358/183
[58] Field of Search ............. 358/183, 22, 185; 358/182, 160; 340/721, 722; H04N 5/262, 5/272, 9/74

[56] References Cited

U.S. PATENT DOCUMENTS

| | | | |
|---|---|---|---|
| 4,698,666 | 10/1987 | Lake, Jr. et al. | 358/22 |
| 4,991,019 | 2/1991 | Enami et al. | 358/160 |
| 5,168,363 | 12/1992 | Kojima et al. | 358/183 |

FOREIGN PATENT DOCUMENTS 2022355 12/1979 United Kingdom .
0211532 2/1987 United Kingdom .

Primary Examiner—Victor R. Kostak
Assistant Examiner—Nathan J. Flynn
Attorney, Agent, or Firm—William S. Frommer; Alvin Sinderbrand

[57] ABSTRACT

An image processing apparatus for applying video effects to input image signals. The apparatus comprises a first signal processor consisting of first and second multipliers for multiplying first and second input image signals by coefficients K and $1-K$ (where $0 \leq K \leq 1$) respectively, and a first adder for adding the output signals of the first and second multipliers to each other; a second signal processor consisting of third and fourth multipliers for multiplying the output signal of the first adder and a third input image signal by coefficients $K'$ and $1-K'$ (where $0 \leq K' \leq 1$) respectively, and a second adder for adding the output signals of the third and fourth multipliers to each other; a memory having a plurality of areas to store first and second key frame data; a controller for controlling the first and second signal processors on the basis of the first and second key frame data stored in the memory; and an input circuit for inputting the first and second frame data to the memory.

3 Claims, 3 Drawing Sheets

IMAGE PROCESSING APPARATUS FOR APPLYING SPECIAL EFFECTS TO IMAGE SIGNALS

BACKGROUND OF THE INVENTION

1. Field of the Invention

The present invention relates to an image processing apparatus for applying video special effects to input image signals and, more particularly, to an apparatus having a key frame function.

2. Description of the Prior Art

There have been known heretofore a variety of special effect apparatus adapted to process an input image signal in a wipe, fade or other video special effect mode, as disclosed in U.S. Pat. No. 4,199,788 for example. Also known is a special effect apparatus having a key frame function wherein, if a round pattern is specified at points A and B as illustrated in FIG. 1, there is attainable an effect of shifting the round pattern automatically from the point A to the point B in a predetermined time. The key frame is a function for producing, by automatic interpolation, data between the states in a special effect process such as a pattern shift, wipe or fade mode.

There is further known another type that executes video special effect processes to input image signals in a plurality of signal processors. However, since merely one key frame list is applied to the plural signal processors in such conventional special effect apparatus, it is impossible to perform the key frame functions independently of one another in the individual signal processors, hence causing difficulties in preparation of key frame lists for complicated shifts of patterns.

OBJECT AND SUMMARY OF THE INVENTION

In view of the circumstances mentioned, it is an object of the present invention to provide an improved image processing apparatus which is capable of easily preparing key frame lists to attain complicated shifts of patterns.

For the purpose of achieving the above object, the image processing apparatus of the present invention for applying video special effects to input image signals comprises a first signal processor consisting of first and second multiplier means for multiplying first and second input image signals by coefficients K and $1-K$ (where $0 \leq K \leq 1$) respectively, and a first adder means for adding the output signals of the first and second multiplier means to each other; a second signal processor consisting of third and fourth multiplier means for multiplying the output signal of the first adder means and a third input image signal by coefficients K' and $1-K'$ (where $0 \leq K' \leq 1$) respectively, and second adder means for adding the output signals of the third and fourth multiplier means to each other; a memory for storing first and second key frame data; control means for controlling the first and second signal processors on the basis of the first and second key frame data stored in the memory; and input means for inputting the first and second key frame data to the memory.

DESCRIPTION OF THE PREFERRED EMBODIMENT

Hereinafter an exemplary embodiment of the present invention will be described in detail with reference to FIG. 2. This embodiment represents an example having three signal processors.

Figure 1:
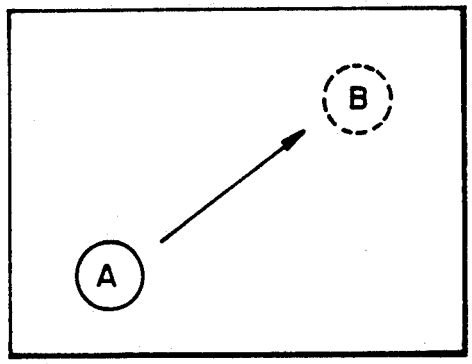
FIG. 1 is a schematic diagram for explaining a key frame function.
Figure 2:
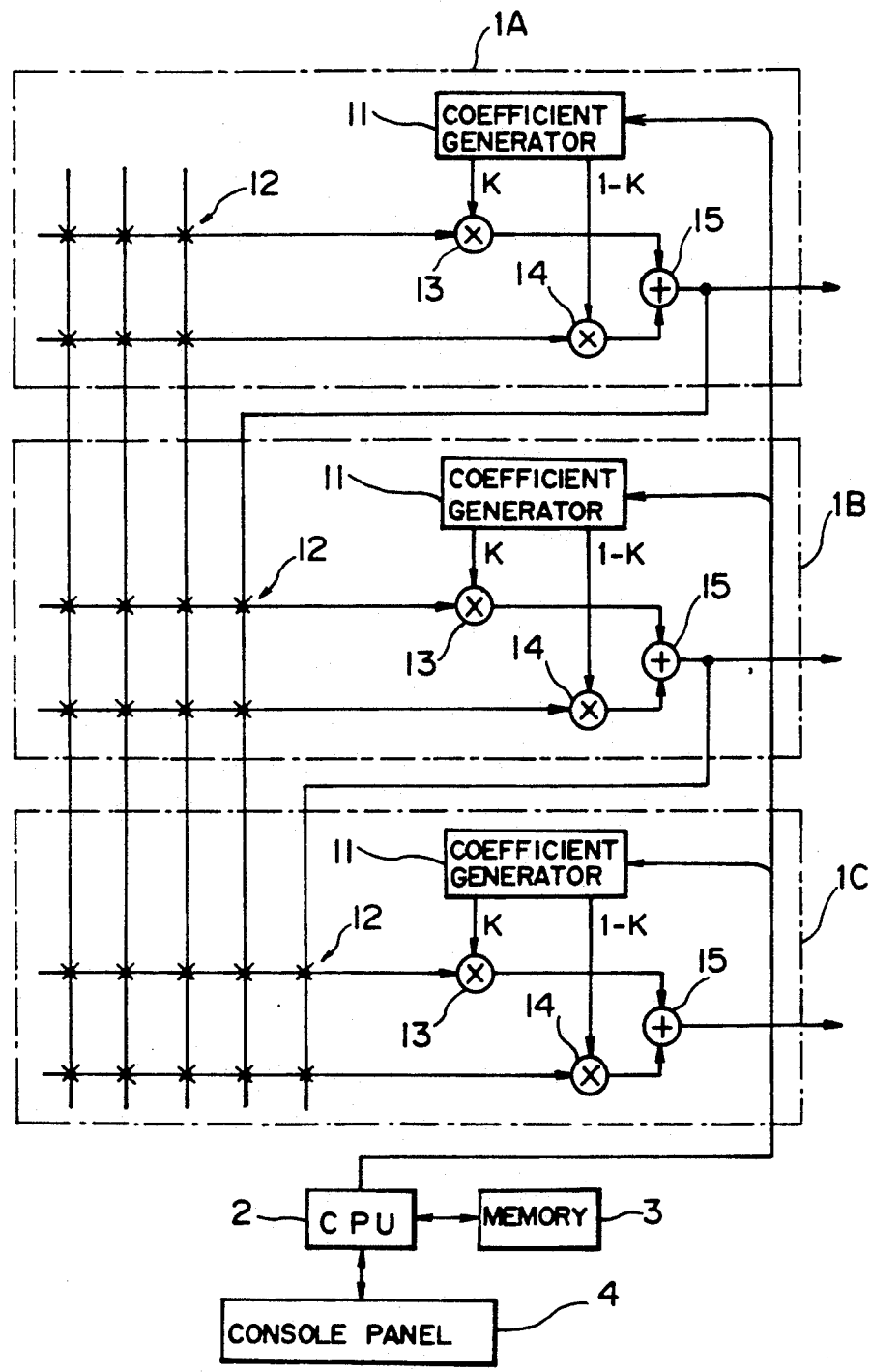
FIG. 2 is a block diagram of an exemplary embodiment representing the image processing apparatus of the present invention.

In FIG. 2, reference numerals 1A to 1C denote signal processors each comprising a coefficient generator 11 for generating coefficients K, $1-K$ (where $0 \leq K \leq 1$), a switch circuit 12 for switching input image signals, multipliers 13, 14 for multiplying the selected two image signals from the switch circuit 12 by the coefficients K, $1-K$, and an adder 15 for adding the output signals of the multipliers 13, 14 to produce an output image signal.

The output image signal from the signal processor 1A is supplied to the switch circuit 12 of the signal processor 1B so as to be selectable as an input image signal thereto, and then the output image signal from the signal processor 1B is supplied to the switch circuit 12 of the signal processor 1C so as to be selectable as an input image signal thereto.

The coefficient generators 11 of the signal processors 1A-1C are controlled by a CPU 2. Although not shown, selection of the image signals by the switch circuits 12 of the signal processors 1A-1C is performed also under control of the CPU 2.

A memory 3 is connected to the CPU 2. In the memory 3, there are areas for storing data (key frame lists) relative to the key-frame effect processors executed in the signal processors 1A-1C. The key frame lists for the signal processors 1A-1C are prepared by an operator's manipulation of a console panel 4 connected to the CPU 2, and the key frame lists thus prepared are written in the corresponding areas respectively in the memory 3.

Figure 3:
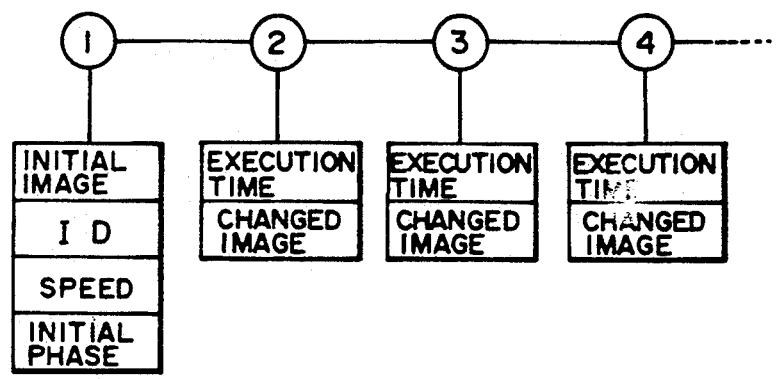
FIG. 3 is a schematic diagram for explaining the structures of key frame lists in the image processing apparatus of FIG. 2.

The key frame lists are so formed as shown in FIG. 3 for example. In the first list (1), there are included first image data, ID for identifying the signal processor, an initial phase for shifting the timing to start the first image, and a speed to prolong or shorten the time of the entire key frame. Meanwhile in each of the second and subsequent lists (2), (3), . . . and so forth, there are included a changed timing (execution time) and a changed image thereat.

The key frame effect process is executed by running the list after registration of the same in an execution list controller of the CPU 2. In the list controller, the process is executed in accordance with the information included in the key frame list. And the key frame list is edited by an edit list controller of the CPU 2. The key frame list prepared in the edit list controller is registered in the aforementioned execution list controller by an access controller of the CPU 2 and then is run automatically.

Any desired key frame effect process can be executed at an arbitrary timing in the signal processors 1A to 1C through control of the registration in the execution list controller by the access controller.

In the constitution mentioned, the key frame lists stored in the memory 3 respectively for the signal processors 1A-1C are read out therefrom and controlled by the CPU 2 so that the key frame effect processes can be executed independently of one another by the signal processors 1A-1C.

In this case, the output image signal of the signal processor 1A is selected by the switch circuit 12 of the signal processor 1B, so that the output image signal of the signal processor 1B corresponds to the composite result of the key frame effect processes executed in the signal processors 1A and 1B. Further the output image signal of the signal processor 1B is selected by the switch circuit 12 of the signal processor 1C, so that the output image signal of the signal processor 1C corresponds to the composite result of the key frame effect processes executed in the signal processors 1A-1C.

During execution of the key frame effect process by one signal processor, a key frame list for the other signal processor can be prepared by manipulation of the console panel 4. For example, in a state where the key frame effect process is being executed by the signal processor 1A, the key frame list for the signal processor 1B can be prepared with reference to the image obtained by supplying the output image signal of the adder 15 of the signal processor 1A to a monitor (not shown).

Figure 4A:
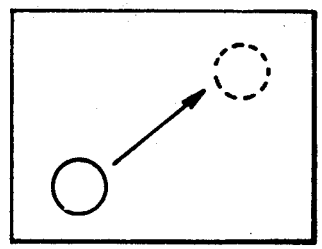
FIGS. 4A and 4B are schematic diagrams for explaining preparation of key frame lists in the image processing apparatus of FIG. 2.
Figure 4B:
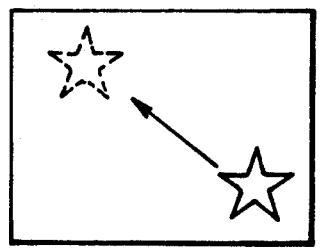

In an exemplary case where the key frame effect in the signal processor 1A is accompanied with a shift of a round-shaped pattern as illustrated in FIG. 4A and the key frame effect in the signal processor 1B is accompanied with a shift of a star-shaped pattern as illustrated in FIG. 4B, it is possible to set the generation timing and so forth of the key frame effect in FIG. 4B while checking the shift of the round-shaped pattern of FIG. 4A on the monitor screen.

Thus, in the embodiment where the memory 3 has areas to store the respective key frame lists for the signal processors 1A-1C, key frame lists can be prepared individually for the signal processors 1A-1C. Therefore it becomes possible to execute the key frame effect processes independently of one another with respect to the individual signal processors 1A-1C. Furthermore, it is also possible to perform an operation of executing the key frame effect process by one signal processors and, with reference to such execution, preparing a key frame list with facility for the other signal processor. And in addition, the key frame list can be changed or deleted with respect to each of the signal processors to consequently realize an advantage that easy changes are attainable in the entire key frame lists.

It is to be understood that the embodiment mentioned represents merely an example equipped with three signal processors 1A-1C, and the present invention is applicable also to any modification having two, four or more signal processors.

According to the present invention where a plurality of memories are incorporated to store data (key frame lists) relative to the key frame effect processes in the individual signal processors, it is possible to prepare key frame lists for the individual signal processors respectively. Therefore the key frame effect processes can be executed independently of one another with respect to the individual signal processors. Furthermore, during execution of the key frame effect process in one signal processor, a key frame list for the other signal processor can be prepared easily with reference to such execution. And it is further possible to change or delete the key frame list with respect to each of the signal processors, hence achieving easy changes of the entire key frame lists.

What is claimed is:

1. (Amended) An image processing apparatus for applying special effects to input image signals, said apparatus comprising:

first signal processor means having first coefficient generator means for generating coefficients K and $1-K$ (wherein $0 \leq K \leq 1$), first switch means receiving a plurality of input image signals for selecting first and second image signals therefrom, first and second multiplier means for respectively multiplying said selected first and second image signals by said coefficients K and $1-K$, and first adder means for adding output signals of said first and second multiplier means together;

second signal processor means having second coefficient generator means for generating coefficients $K'$ and $1-K'$ (wherein $0 \leq K' \leq 1$), second switch means receiving said plurality of input image signals and an output signal from said first adder means for selecting third and fourth image signals therefrom, third and fourth multiplier means for respectively multiplying said selected third and fourth image signals by said coefficients $K'$ and $1-K'$, and second adder means for adding output signals of said third and fourth multiplier means together;

generating means for generating first and second key frame data;

memory means having a plurality of storage areas for receiving said first and second key frame data from said generating means and for storing said first and second key frame data in respective ones of said storage areas; and control means for controlling said first and second signal processor means on the basis of the first and second key frame data stored in said memory means so as to respectively effect key frame processing thereat.

2. The image processing apparatus according to claim 1, further comprising:

a first monitor for displaying the output signal of said first adder means; and a second monitor for displaying an output signal of said second adder means.

3. The image processing apparatus according to claim 1, wherein said control means further controls said generating means and said memory means such that, during the key frame processing in one of said first and second signal processor means, the key frame data for the other signal processor means not performing key frame processing can be supplied thereto.

* * * * *